Oct. 14, 1958  J. B. GRAVES  2,855,724
TREE GIRDLING TOOL
Filed Sept. 19, 1957
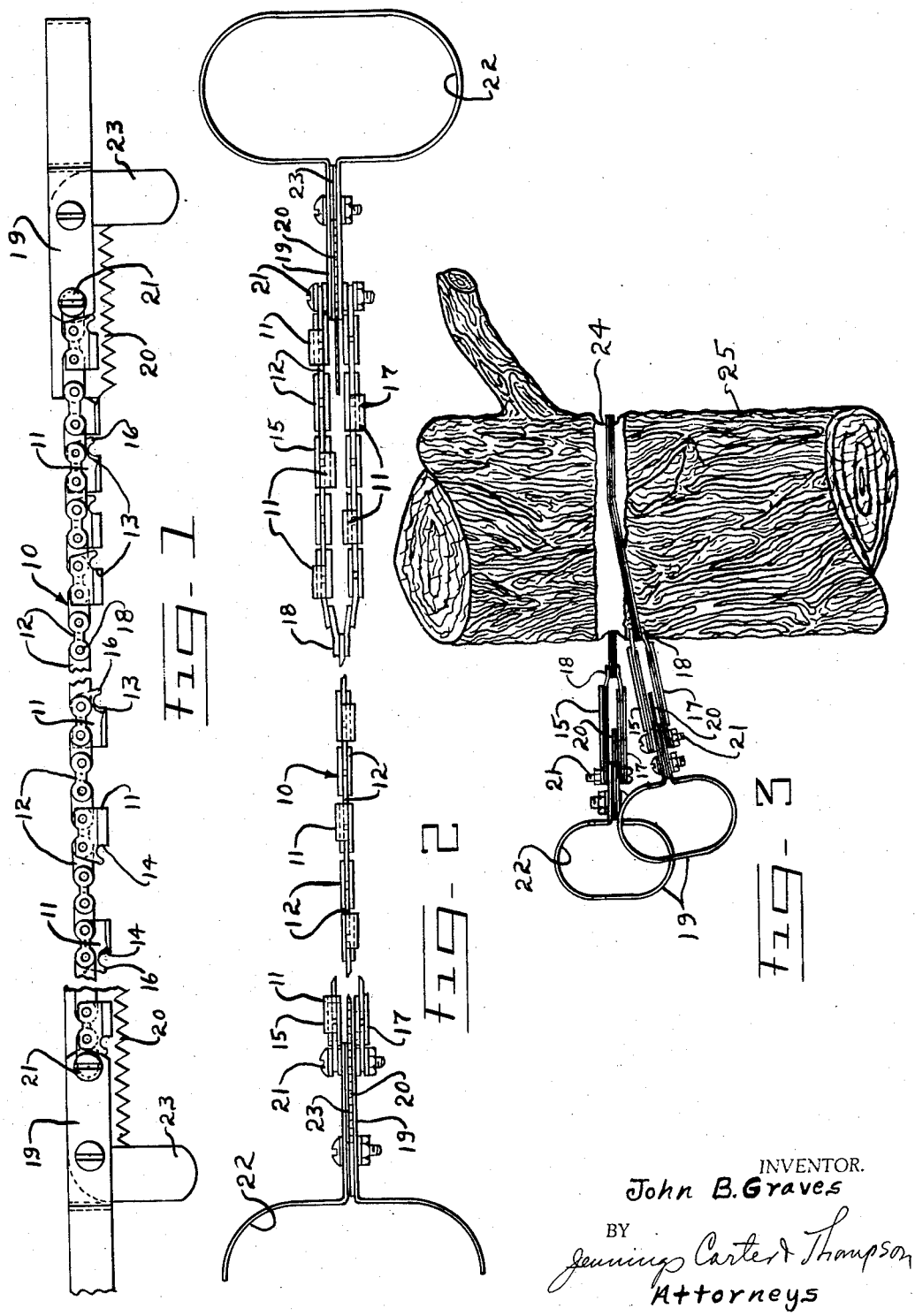
INVENTOR.
John B. Graves
BY
Jennings Carter & Thompson
Attorneys United States Patent Office 2,855,724
Patented Oct. 14, 1958

2,855,724
TREE GIRDLING TOOL
John B. Graves, Talladega, Ala.
Application September 19, 1957, Serial No. 684,878
3 Claims. (Cl. 47—1)

This invention relates to a tree girdling tool such as may be employed for removing the bark in a band around a tree in order to kill the tree and has for an object the provision of a tool of the character designated in the form of a hand operated chain saw.

A further object of my invention is to provide a tree girdling tool in the form of a chain saw which shall be entirely safe to operate and be adapted to cut the bark when being actuated alternately in opposite directions.

A more particular object of my invention is to provide a tree girdling tool in the form of a manually operated chain saw in which a portion of the length of the saw is doubled or widened in order to widen the saw groove for the trailing portion of the saw section when the tool is in use.

A still further object of my invention is to provide a tree girdling tool in the form of a manually operated chain saw with handles on the ends and with projections on the handles positioned to engage the bark of the tree in operation and thus protect the user's fingers.

In the present-day practice of forestry, in order to improve a timber stand, it is the practice to kill out undesirable or "weed" trees. The most common method of accomplishing this purpose is to girdle the trees, or remove the bark around a tree in a narrow path, which operation causes the tree to die. Heretofore, the girdling of trees has been done with an axe, supplemented by the injection of poison into the trunk of the tree. Still another method is to girdle the tree by means of a power driven machine which may be carried on the forester's back. Both of these methods entail a hazard for the workman and also considerable physical labor and it is accordingly a prime object of my invention to provide a tool which may be operated with a minimum of danger to the workman and a minimum of labor; also a minimum of weight so that it may be carried by a worker without undue physical exertion, and one which is effective to girdle a tree quickly and efficiently.

A girdling tool embodying features of my invention is illustrated in the accompanying drawing, forming a part of this application, in which:

Fig. 1 is a side elevation of the tool;
Fig. 2 is a plan view taken at right angles to the showing of Fig. 1; and,
Fig. 3 is a side elevational view showing the tool in use in girdling a tree.

Referring to the drawing for a better understanding of my invention, I show in Fig. 1 a chain saw 10 having saw elements 11 connected together by means of links 12. The saw elements 11 at the right-hand end of the saw, as viewed in the drawing, from the middle of the saw outwards, have their cutting edges 13 facing toward the right, as viewed in the drawing, while the saw elements 11 at the opposite end of the tool have their cutting edges 14 facing the opposite end of the tool. The saw elements 11 each embody the usual depth gauge members 16.

At the ends of the tool, the chain saw is doubled in width as shown in Fig. 2 by connecting two relatively short sections 15 and 17 to the chain saw, as at 18, and connecting the two ends of the saw 10 and the short sections 15 and 17 at each end, to a handle 19 by a suitable connection permitting pivotal movement, as by means of a bolt 21.

Each of the handles 19 embodies a loop 22, which may be grasped by the user in operating the tool. Also, each of the handles 19 embodies a downwardly depending lug 23, as viewed in the drawing, Fig. 1, to prevent the user's fingers from engaging the bark of a tree being girdled.

By reference to Fig. 3 of the drawing, the operation of my improved tree girdling tool, will be readily understood. The chain 10 which is of a length to encircle a tree, is placed around a tree trunk 25 to be girdled with the cutting elements of the saw facing the tree, as is shown in the drawing, and the user grasps the loops 22 of the handles and pulls the tool back and forth, moving around the tree as the work proceeds until a cut 24 of the desired depth is made all around the tree trunk. As the work proceeds, the cutting edges 13 at one end of the saw cut a path while the tool is being moved in one direction and the cutting edges 14 on the other saw elements 11 serve to cut the bark while the tool is being pulled in the opposite direction. The doubling of the width at the ends of the tool serves to cut the path wider and prevents any binding of the saw elements as the work proceeds and the short rigid saw section aids in cutting the bark at the beginning of the operation. Also, it will be seen, the lugs 23 on the inner sides of the handles 19 are so positioned as to guard against engagement of the bark of the tree by the fingers of the user.

From the foregoing it will be apparent that I have devised an improved tree girdling tool, which is light of weight, simple of construction, and safer in operation than prior art devices, and one which is capable of cutting a girdling path around a tree trunk in a minimum of time.

While I have shown my intention in but one form it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. A tree girdling saw comprising a multiplicity of saw elements linked together to form a chain saw, the cutting edges of the saw elements from the middle of the saw toward one end thereof facing in the direction of said end of the saw, and the cutting edges of the saw elements from the middle toward the opposite end of the saw facing toward said opposite end of the saw, the saw being doubled in width for a relatively short distance near both ends thereof, and handles on the ends of the saw to provide for manual operation thereof.

2. A tree girdling saw comprising a flexible saw with saw elements linked together and having the cutting edges of the saw elements facing in opposite directions from the middle of the saw outwards, handles pivotally connected to the opposite ends of the saw, guard elements extending inwardly from the handles, the saw being doubled in width adjacent its ends and a pivotal connection between the ends thereof and the handles.

3. A tree girdling saw comprising a flexible chain saw having a plurality of saw elements linked together to form cutting edges, the middle of the saw being of a single chain width, and the saw being of a double chain width for a relatively short distance near both ends thereof, whereby the double chain widths cut a wider path than the middle of the saw.

References Cited in the file of this patent
UNITED STATES PATENTS

| 582,966 | Twiss | May 18, 1897 |
| 2,752,964 | Prusinski | July 3, 1956 |

FOREIGN PATENTS

| 279,698 | Switzerland | Mar. 17, 1952 |